(12) United States Patent
Mair (10) Patent No.: US 8,672,806 B2
(45) Date of Patent: Mar. 18, 2014

(54) METHOD FOR DETERMINING A STARTING SPEED IN A MOTOR VEHICLE

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/642,246

(22) PCT Filed: Mar. 2, 2011

(86) PCT No.: PCT/EP2011/053114
§ 371 (c)(1),
(2), (4) Date: Oct. 19, 2012

(87) PCT Pub. No.: WO2011/134704
PCT Pub. Date: Nov. 3, 2011

(65) Prior Publication Data
US 2013/0040781 A1  Feb. 14, 2013

(30) Foreign Application Priority Data
Apr. 28, 2010 (DE) .......................... 10 2010 028 282

(51) Int. Cl.
*B60W 10/00* (2006.01)
*B60W 10/02* (2006.01)

(52) U.S. Cl.
USPC .......................................... 477/79; 192/3.63

(58) Field of Classification Search
USPC .................................................. 477/79, 80
See application file for complete search history.

(56) References Cited

U.S. PATENT DOCUMENTS

| | | | |
|---|---|---|---|
| 6,151,978 A * | 11/2000 | Huber | 74/336 R |
| 6,394,931 B1 * | 5/2002 | Genise | 477/97 |
| 6,519,522 B1 * | 2/2003 | Wolf et al. | 701/61 |
| 6,692,406 B2 | 2/2004 | Beaty | |
| 6,846,269 B2 | 1/2005 | Reuschel et al. | |

(Continued)

FOREIGN PATENT DOCUMENTS

| DE | 198 39 837 A1 | 3/2000 |
|---|---|---|
| DE | 101 39 122 A1 | 3/2002 |

(Continued)

OTHER PUBLICATIONS

German Search Report Corresponding to DE 10 2010 028 282.0.

(Continued)

*Primary Examiner* — Dirk Wright
(74) *Attorney, Agent, or Firm* — Davis & Bujold, PLLC; Michael J. Bujold (57) ABSTRACT

A method for determining a startup gear in a motor vehicle for starting from standstill while maintaining a load limit of the clutch in a the drive train which comprises a drive engine built as an internal combustion engine, a friction clutch, and an automatic stepped transmission. To avoid overloading the clutch, the method determines a load-independent startup gear with which startup would occur under the present starting conditions without considering the current load state of the clutch and without complying with a load limit of the clutch. A load-specific startup gear is determined as the highest startup gear, with which during a startup under the present starting conditions, a predefined load limit of the clutch would be maintained with consideration given to the present load state of the clutch. The startup gear is the lowest of the load-independent startup gear and the at least one load-specific startup gear.

19 Claims, 2 Drawing Sheets

(56) References Cited

U.S. PATENT DOCUMENTS

| | | | |
|---|---|---|---|
| 6,953,410 B2 * | 10/2005 | Wheeler et al. | 475/115 |
| 7,220,215 B2 * | 5/2007 | Eriksson et al. | 477/107 |
| 8,401,750 B2 * | 3/2013 | Karlsson | 701/58 |
| 2005/0153815 A1 | 7/2005 | Janssen | |
| 2007/0142165 A1 | 6/2007 | Klinkner et al. | |
| 2010/0185370 A1 * | 7/2010 | Wurthner et al. | 701/61 |
| 2011/0237393 A1 | 9/2011 | Mair | |
| 2013/0040779 A1 * | 2/2013 | Schneider et al. | 477/83 |
| 2013/0040780 A1 * | 2/2013 | Mair | 477/99 |

FOREIGN PATENT DOCUMENTS

| | | |
|---|---|---|
| DE | 102 34 428 A1 | 2/2004 |
| DE | 103 30 951 A1 | 1/2005 |
| DE | 103 35 259 A1 | 2/2005 |
| DE | 10 2006 027 865 A1 | 12/2007 |
| DE | 10 2007 019 729 A1 | 10/2008 |
| DE | 10 2007 031 725 A1 | 1/2009 |
| DE | 10 2008 054 802 A1 | 6/2010 |
| EP | 1 070 625 A2 | 1/2001 |
| EP | 1 354 751 A2 | 10/2003 |

OTHER PUBLICATIONS

International Search Report Corresponding to PCT/EP2011/053109.
International Search Report Corresponding to PCT/EP2011/053113.
International Search Report Corresponding to PCT/EP2011/053112.
International Search Report Corresponding to PCT/EP2011/053114.
Written Opinion Corresponding to PCT/EP2011/053109.
Written Opinion Corresponding to PCT/EP2011/053113.
Written Opinion Corresponding to PCT/EP2011/053112.
Written Opinion Corresponding to PCT/EP2011/053114.

* cited by examiner

METHOD FOR DETERMINING A STARTING SPEED IN A MOTOR VEHICLE

This application is a National Stage completion of PCT/EP2011/053114 filed Mar. 2, 2011, which claims priority from German patent application serial no. 10 2010 028 282.0 filed Apr. 28, 2010.

FIELD OF THE INVENTION

The invention relates to a method for determining a startup gear in a motor vehicle, the drive train of which comprises a drive engine built as an internal combustion engine, a startup element built as an automated friction clutch, and a transmission built as an automatic stepped transmission, wherein a startup gear is determined for startup from standstill while maintaining a load limit of the friction clutch.

BACKGROUND OF THE INVENTION

For a startup from standstill with a multi-stage stepped transmission, in principle, several gears can be considered for the startup gear. One such startup situation occurs in particular in the case of a startup on a plane and on an incline. With the startup, the engine torque that can be generated by the drive engine and transmitted to the friction clutch as the startup torque must be sufficiently high in order to compensate for the stationary drive resistance of the motor vehicle, which is formed in this situation by the rolling resistance and incline resistance, given the overall transmission ratio determined by the respective startup gear and the efficiency of the drive train, and in addition, to deliver excess torque for startup acceleration of the motor vehicle.

In the process, it must be considered that active output drive-side power take-offs, that is, power take-offs disposed at the transmission and/or the axle transmission, reduce the engine torque that can be used for startup, which can be considered as a fictional additional resistance for the determination of the startup gear. In contrast, auxiliary consumers driven directly by the drive engine, such as an electric generator, a servo pump of a servo steering, and an air conditioning compressor of an air conditioning system, as well as active drive-side power take-offs, that is, power take-offs disposed directly at the drive engine, reduce, already at the source of the rotational energy, the engine torque that can be delivered by the drive engine to the friction clutch and available for startup.

Furthermore, the startup acceleration should correspond to the respective power request by the driver, which is given by the gas pedal deflection or the gas pedal position respectively, increasing with increasing gas pedal deflection and decreasing with increasing road incline. With increasing gas pedal deflection at a constant road incline, the driver accordingly expects faster startup acceleration, whereas in contrast with an increasing road incline with a constant gas pedal position the driver expects slower startup acceleration.

A determination of the startup gear depending only on the startup situation typically occurs using the characteristic curves or characteristic maps, which are modified to the respective vehicle configuration using complex application methods, and which contain at least the vehicle mass, the roadway incline and the gas pedal position as parameters.

For a startup from standstill the friction clutch can be a passive engageable single or multi-disc dry clutch or an active engageable multi-disc clutch, for bridging the speed difference between the engine speed and the transmission input speed and the transmission input shaft in slipping operation, until the motor vehicle has accelerated to the extent that synchronous running is attained at the input and output sides of the friction clutch so that the clutch can be completely engaged.

The startup-dependent slipping operation represents a high mechanical and thermal load for the friction clutch that increases with the value of the startup torque, the value of the slip speed and the duration of the slipping operation, and which forms an essential parameter for determining the startup gear.

If the startup gear is set too low, fast startup acceleration and a correspondingly shorter slipping operation of the friction clutch is possible. Due to the high transmission ratio of the startup gear, noise develops, and due to the high startup speed, the fuel consumption of the internal combustion engine is unfavorably high.

In addition, due to the fast startup acceleration a shift speed is attained relatively quickly and a shift is triggered to a higher gear. This is considered uncomfortable and particularly at high drive resistance, for instance on a steep incline or on difficult terrain, can lead to a strong delay of the vehicle during the shift-dependent interruption of the tractive force and consequently to an interruption of the startup.

If in contrast, the startup gear is too high, the slipping speed is relatively high at the friction clutch due to the low transmission ratio of the startup gear. Due to the slow startup acceleration, the duration of the slipping operation can be so long that the friction clutch is thermally overloaded.

Therefore, the general aim is to perform a startup of a motor vehicle in the highest possible gear, however without mechanically and thermally overloading the friction clutch in the process. Thus, methods for determining a startup gear are known from the documents DE 198 39 837 A1 and U.S. Pat. No. 6,953,410 B2, with which the highest possible startup gear is determined from the present drive resistance of the motor vehicle and the available engine torque of the drive train so that the expected duration of slipping of the friction clutch during the startup and/or the thermal energy created in friction clutch in slipping operation do not exceed predetermined limit values.

The document U.S. Pat. No. 7,220,215 B2 describes a commercial vehicle with a control device with which the highest possible startup gear is determined so the maximal engine torque that can be generated by the drive engine at idle speed is sufficient for the startup, and the thermal energy created in the process in the friction clutch does not exceed a predetermined limit value.

In the case of commercial vehicles, the drive engines are usually designed as turbo-charged diesel engines, which have a specific load build-up characteristic. According to the document DE 10 2008 054 802 A1, which was previously unpublished, and which discloses a method for controlling an automatic stepped transmission depending on the dynamic operating characteristics of a turbo-charged internal combustion engine, a turbo-charged internal combustion engine can spontaneously, that is with high torque gradients, only reach an intake torque lying below the full load torque.

A further increase of the engine torque is briefly possible, although with low torque gradients, only above a boost threshold speed, after which the turbo-charger creates a significant increase of the charge pressure and thus the engine torque. Thus, aside from the idle speed, cut-off speed and the full load torque characteristic curve, the dynamic behavior of a turbo-charged internal combustion engine is also determined by the boost threshold speed and the intake torque characteristic curve as well as by the present torque gradients, at least in certain regions.

Therefore, the dynamic operating properties of a drive engine built as a turbo-charged internal combustion engine are also significant for determining a startup gear, because starting from the idle speed only the intake torque is spontaneously built up and usable as the startup torque. If the intake torque is not sufficient as startup torque, the engine speed must be increased above the boost threshold speed, in order to be able to increase the engine torque above the intake torque by increasing the charge pressure. In this case however, due to the hereby increased slipping speed and the slowdown of the torque buildup, the mechanical and thermal load of the friction clutch increases significantly.

With the previously known methods for determining a startup gear, the present load state of the friction clutch, repeated startups without significant cooling of the friction clutch in between, and the dynamic operating properties of the drive engine were not considered, or not sufficiently considered. This can have the consequence that the friction clutch, despite nominally maintaining the intended load limit, is mechanically and/or thermally overloaded, and consequently does not attain an intended service life or is destroyed during a startup procedure.

SUMMARY OF THE INVENTION

Therefore, the problem addressed by the present invention is to propose a method for determining a startup gear for startup from standstill with a motor vehicle of the initially named type, with which the present operating state and the operating properties of the friction clutch and the drive engine are considered, and thus overload of the friction clutch can be reliably avoided.

This problem is solved in that a load-independent startup gear $G_{Anf\_Typ}$ is determined with which in the case of a startup, this startup would occur under the present starting conditions ($m_{Fzg}$, $\alpha_{FB}$, $x_{FP}$) without taking into consideration the current load state of the friction clutch and without complying with a load limit of the friction clutch, that at least one load-specific startup gear ($G_{Anf\_Max1}$, $G_{Anf\_MaxN}$, $G_{Anf\_Lim}$, $G_{Anf\_Def}$) is determined as the highest startup gear, with which in the case of a startup under the present starting conditions a predefined load limit of the friction clutch would be maintained while taking into consideration the present load state of the friction clutch, and that the startup gear ($G_{Anf}$) intended for the present startup is determined in a minimum selection as the lowest startup gear of the load-independent startup gear and the at least one load-specific startup gear, thus ($G_{Anf}$=min ($G_{Anf\_Typ}$, $G_{Anf\_Max1}$, $G_{Anf\_MaxN}$, $G_{Anf\_Lim}$, $G_{Anf\_Def}$)).

Accordingly, the invention assumes a known motor vehicle, a commercial vehicle for example, the drive train of which comprises a drive engine built as an internal combustion engine, a startup element built as an automated friction clutch, and a transmission built as an automatic stepped transmission. For startup from standstill, the provided startup gear $G_{Anf}$ according to the invention is determined from a minimum selection of at least two determined startup gears.

A first startup gear $G_{Anf\_Typ}$ is determined only depending on the present startup conditions, which are given by the present drive resistance of the motor vehicle and the power request of the driver, independent of the load, that is, without taking into consideration the present load state of the friction clutch and without complying with a load limit of the friction clutch. Whereas the drive resistance is determined largely by the vehicle mass $m_{Fzg}$ and the roadway incline $\alpha_{FB}$, the power request of the driver is largely given by the gas pedal deflection $x_{FP}$. This load-independent startup gear $G_{Anf\_Typ}$ can presently be calculated by means of startup parameters $m_{Fzg}$, $\alpha_{FB}$, $x_{FP}$ recorded by sensors or predetermined in a preceding travel cycle, or calculated in a known manner from corresponding characteristic curves and characteristic maps.

In contrast, at least one additional startup gear $G_{Anf\_Max1}$, $G_{Anf\_MaxN}$, $G_{Anf\_Lim}$, $G_{Anf\_Def}$ is determined however load-specific as the highest startup gear with which startup would occur in the case of a startup under the present startup conditions while adhering to a predetermined load limit of the friction clutch with consideration of the present load state of the friction clutch. The mechanical and thermal load of the friction clutch occurring with the respective startup gear can be calculated relatively precisely from the intended speed and torque progressions.

Using the proposed minimum selection of the load-independent startup gear $G_{Anf\_Typ}$ and the at least one load-specific startup gear $G_{Anf\_Max1}$, $G_{Anf\_MaxN}$, $G_{Anf\_Lim}$, $G_{Anf\_Def}$, it is guaranteed that the intended load limit of the friction clutch is actually maintained. If the intended load limit of the friction clutch is maintained with the typically used load-independent startup gear $G_{Anf\_Typ}$, the startup occurs with the startup gear expected by the driver, ($G_{Anf}$=$G_{Anf\_Typ}$). Otherwise, the startup occurs with the respective lowest, load-specific startup gear $G_{Anf\_Max1}$, $G_{Anf\_MaxN}$, $G_{Anf\_Lim}$, $G_{Anf\_Def}$.

Particularly in the case of commercial vehicles, the drive engine is frequently built as a turbo-charge internal combustion engine which has a specific load build-up characteristic. Thus, a turbo-charged internal combustion engine below the boost threshold speed $n_{L\_min}$ can spontaneously, that is, with high torque gradients, only reach an intake torque $M_S$ lying below the full load torque $M_{VL}(n_M)$. Therefore, with a design of the drive engine as a turbo-charged internal combustion engine, in addition a turbo-specific startup gear $G_{Anf\_MS}$ is expediently determined as the highest startup gear with which the intake torque $M_S$ of the drive engine is sufficient as startup torque for a startup under the present startup conditions, and the turbo-specific startup gear $G_{Anf\_MS}$ is considered in the minimum selection of the startup gears.

The relevant data which represents the dynamic operating characteristics of the internal combustion engine can be taken either directly from the engine control device or from a data store of the transmission control device. As already described in the document DE 10 2008 054 802 A1, this data that corresponds to the vehicle configuration, can be transferred to the data store of the transmission control device at the end of the production line of the motor vehicle, and later during travel operation can be adapted through comparison with the current operating data, particularly of the drive engine, that is, adapted to the changed operating characteristics. By accessing such updated data, the present method for the determining a startup gear is automatically adapted to the changed operating characteristics of the motor vehicle or of the drive engine.

A load-specific limit startup gear $G_{Anf\_Max1}$ can be determined as the highest startup gear with which a single startup is possible with startup under the present startup conditions ($m_{Fzg}$, $\alpha_{FB}$, $x_{FP}$) without exceeding a breakdown-specific load limit of the friction clutch in the process. Because in the case of a startup with the limit startup gear $G_{Anf\_Max1}$ the highest permissible load of the friction clutch would arise, this represents the highest possible startup gear under the present operating conditions ($m_{Fzg}$, $\alpha_{FB}$, $x_{FP}$).

A further load-specific startup gear $G_{Anf\_MaxN}$ can be determined as the highest startup gear with which an expected number of consecutive startups is possible without substantial cooling phases with startup under the present startup conditions ($m_{Fzg}$, $\alpha_{FB}$, $x_{FP}$) without exceeding the breakdown-specific load limit of the friction clutch in the process.

Due to immediately consecutive startups and the corresponding load of the friction clutch, in most cases this startup gear $G_{Anf\_MaxN}$ lies significantly below the limit startup gear $G_{Anf\_Max1}$, and the number of possible sequential startups is preferably relatively small.

The expected number of consecutive startups without substantial cooling phases that is used here can be determined based on the use profile of the motor vehicle and/or from the present driving situation of the motor vehicle. With the motor vehicle, for instance, a garbage truck or a package or postal delivery truck that travels from one house to another or, as in the case of a city bus, that travels from bus stop to bus stop, the expected number of the sequential startups can be specifically predetermined, or adaptively determined from the past operating phases.

Likewise, the expected number of sequential startups can be determined from the present traffic situation, such as stop-and-go operation in a traffic jam or in inner-city commuter traffic. Here, the load of the friction clutch that occurs in each case depends, in addition to the vehicle mass $m_{Fzg}$, substantially on the average present roadway incline, $\alpha_{FB}$, that is, the corresponding topographic data, which can be determined in conjunction with a navigation device in the prior travel operation phases, or can be contained in a digital street map provided with corresponding data.

A spontaneous failure of the friction clutch is caused largely due to thermal overloading, that is, a friction-dependent introduction of heat that is too large.

Accordingly, the failure-specific load limit of the friction clutch can be defined as a temperature limit value $T_{K\_max}$ of the friction clutch that must be maintained for avoiding a spontaneous failure of the friction clutch. Analogous to this, the present load state of the friction clutch is determined before startup in this case using the present clutch temperature $T_K$ of the friction clutch. The present clutch temperature $T_K$ of the friction clutch can be recorded using a temperature sensor disposed at the friction clutch for example, or can be appropriately calculated. Accordingly, the load of the friction clutch during a startup procedure is determined as the estimated temperature increase $\Delta T_K$ by which the currently present clutch temperature $T_K$ will be increased during the startup procedure.

The failure-specific load limit of the friction clutch can however also be defined as a thermal capacity limit $Q_{K\_max}$ of the friction clutch, which should be maintained for avoiding a spontaneous failure of the friction clutch. Accordingly in this case, the present load state of the friction clutch is determined before the startup using the present thermal content $Q_K$ of the friction clutch, which is given by the calculated heat introduction with past startups and the estimated thermal loss during the interspersed cooling phases. The load of the friction clutch due to a startup procedure is then determined as the anticipated increase of the thermal content $\Delta Q_K$ by which the currently present thermal content $Q_K$ is increased during the startup procedure.

A driving performance oriented load-specific startup gear $G_{Anf\_Lim}$ can be determined as the highest startup gear with which startup under the present startup conditions ($m_{Fzg}$, $\alpha_{FB}$, $x_{FP}$) largely fulfills the driving performance request of the driver, and a service life-specific load limit of the friction clutch is exceeded maximally by a specific tolerance threshold.

The service life of a friction clutch is determined by the mechanical wear of the friction linings, as long as no thermal overloading has occurred in the meantime. If a specific wear per startup is given as a service life-specific load limit for attaining a designated service life of the friction clutch, this is an average value which must be maintained only on average, that is, averaged over many startups. Accordingly this load limit value, as is intended here with the drive performance-oriented startup gear $G_{Anf\_Lim}$ for satisfying the power request of the driver, can be moderately exceeded on a sporadic basis without endangering the maintenance of the service life of the friction clutch.

This performance-oriented startup gear $G_{Anf\_Lim}$ also expediently represents the highest startup gear to which the startup gear $G_{Anf}$ determined in the minimum selection, can be corrected manually by the driver, that is, by an appropriate intervention of the driver in the control of the gear selection, for instance by deviation of a shift lever located in a manual shift gate into an upshift or downshift direction.

In additional load-specific startup gear $G_{Anf\_Def}$ can be determined as the highest startup gear with which the service life-specific load limit of the friction clutch is not exceeded with a startup under the present drive conditions ($m_{Fzg}$, $\alpha_{FB}$, $x_{FP}$).

Because the mechanical wear of the friction linings per startup can barely be detected by sensors, the service life-specific load limit of the friction clutch can be defined alternatively as an incremental limit value of the clutch temperature $\Delta T_{K\_max}$ of the friction clutch, by which the present clutch temperature $T_K$ is to be maximally increased during the intended startup procedure for attaining a specified service life goal of the friction clutch. The temperature increase $\Delta T_K$ of the friction clutch is used in this case as an equivalent for the mechanical wear of the friction linings during startup.

As an alternative to this, the service life-specific load limit of the friction clutch can also be defined as an incremental limit value of the thermal content $\Delta Q_{K\_max}$ of the friction clutch, by which the present thermal content $Q_K$ of the friction clutch is to be maximally increased during the intended startup procedure for attaining a specified service life goal of the friction clutch. In this case, the increase $\Delta Q_K$ of the thermal content of the friction clutch is used as an equivalent to the mechanical wear of the friction linings during a startup.

If necessary, a speed-specific startup gear $G_{Anf\_vZiel}$ can be determined in addition as the highest startup gear with which a predetermined target speed can be attained without a downshift with the engaged friction clutch in the case of a startup under the present startup conditions ($m_{Fzg}$, $\alpha_{FB}$, $x_{FP}$), and this speed-specific startup gear $G_{Anf\_vZiel}$ can be considered with the named minimum selection of the startup gears. The startup gear chosen here must not be too high such that the target speed is exceeded already at an idle engine speed and an engaged friction clutch, which would require a downshift and traveling with a slipping friction clutch.

The consideration the speed-specific startup gear $G_{Anf\_vZiel}$ is particularly significant for specific-use vehicles, such as collection vehicles which must travel from loading station to the loading station or concrete mixers which must deposit concrete caterpillars, for which the target speed $v_{Ziel}$ of the respective startup is relatively low. With such applications, the target speed $v_{Ziel}$ to be attained should be as close as possible to the idle speed $n_{idle}$ of the drive engine, that is, the present drive resistance in the case of an intake engine can be compensated by the corresponding full load torque $M_{VL}(n_M)$ of the drive engine, and in the case of a turbo-charged internal combustion engine by the intake torque $M_S$ of the drive engine.

If the startup gear $G_{Anf}$ determined in the minimum selection is not available, expediently the next lowest startup gear ($G_{Anf}=G_{Anf-1}$) is used for the intended startup because overloading of the friction clutch is reliably excluded with this startup gear.

However, if the startup gear $G_{Anf}$ determined in the minimum selection and the next lowest startup gear $G_{Anf-1}$ are not available, the next higher startup gear ($G_{Anf}=G_{Anf+1}$) can also be used for the intended startup; the use thereof however under unfavorable operating conditions can be associated with overloading of the friction clutch.

If neither the startup gear $G_{Anf}$ determined in the minimum selection nor the next lowest startup gear $G_{Anf-1}$ are available for the intended startup, the search for the next lowest gear continues until the first gear of the stepped transmission is reached. The next higher startup gear ($G_{Anf}=G_{Anf+1}$) for the intended startup is only used if neither the startup gear $G_{Anf}$ determined in the minimum selection nor the next lower startup gear are available up until reaching the first gear of the step transmission as the startup gear.

A thermal overload of the friction clutch can be assumed particularly if the next higher startup gear $G_{Anf+1}$ lies above the load specific limit startup gear $G_{Anf\_Max1}$. Therefore in this case, the startup is typically prevented and this is indicated to the driver by issuing an audible and or visual warning signal.

The startup with the startup gear $G_{Anf+1}$ lying above the load-specific limit startup gear $G_{Anf\_Max1}$ can be permissible however in emergency operation, if a specific driver action requires an emergency startup. An emergency startup can be requested by the driver for example by simultaneously activating the gas pedal and an emergency switch, or by holding of the gas pedal in the maximum setting thereof for a prolonged period.

Such an emergency startup is required for example if the motor vehicle is located in a hazardous location such as in an intersection or on a railroad crossing. In such an emergency situation, an emergency startup is viewed as advantageous even under inclusion of overloading or destruction of the friction clutch in order to avoid even greater damage such as that caused by a collision with another vehicle or with the train.

With a known maneuvering situation, an additional maneuvering-specific startup gear $G_{Anf\_Rang}$ can be determined as the highest startup gear with which under the present startup conditions ($m_{Fzg}$, $\alpha_{FB}$, $x_{FP}$) the friction power generated at the friction clutch in the continued slipping operation corresponds more or less to the available cooling power of the friction clutch. In this case, this range-specific startup gear $G_{Anf\_Rang}$ is also considered with the minimum selection of the startup gears.

BRIEF DESCRIPTION OF THE DRAWINGS

For illustrating the invention, the description is accompanied by a drawing with an example embodiment. The figures show:

FIG. 1 the determination of a load-independent startup gear for startup from standstill in a transmission ratio/incline graph, FIG. 2 a schematic of a drive train of a heavy-duty commercial vehicle, FIG. 3 an engine dynamic characteristic curve of a turbocharged internal combustion engine, FIG. 4a the torque build-up of an internal combustion engine according to FIG. 3 with an engine speed controlled below the boost threshold speed, thus ($n_M \leq n_{L\_min}$), and FIG. 4b the torque build-up of an internal combustion engine according to FIG. 3 with an engine speed controlled above the boost threshold speed, thus ($n_M > n_{L\_min}$).

DETAILED DESCRIPTION OF THE PREFERRED EMBODIMENTS

Figure 2:
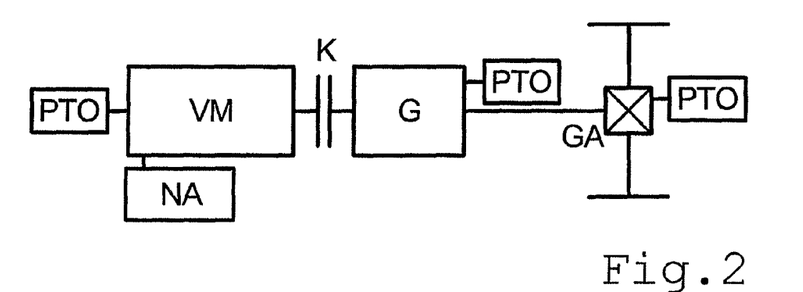

A drive train, shown schematically in FIG. 2, of a heavy-duty commercial vehicle comprises a drive engine designed as a turbo-charged internal combustion engine VM, a startup element designed as an automated friction clutch K, and a transmission designed as an automated stepped transmission G. The stepped transmission G can be connected on the input side, via the friction clutch K, to the drive shaft (crankshaft) of the internal combustion engine VM, and on the output side, via a cardan shaft, to the axle transmission GA (axle differential) of the drive axle.

At least one auxiliary consumer NA and optionally at least one drive-side power take-off PTO are disposed at the internal combustion engine VM, which in the driven state reduce the engine torque $M_M$ of the internal combustion engine VM that can be delivered at the friction clutch and that is available for a startup process. At least two further output-side power take-off-offs PTO are disposed at the stepped transmission G and the axle transmission GA, and further reduce the engine torque $M_M$ transmitted via the friction clutch K into the stepped transmission such that with a startup procedure a correspondingly reduced torque is effective at the drive wheels of the drive axle for overcoming the drive resistance and attaining an at least minimal startup acceleration.

With a startup procedure, the internal combustion engine VM must therefore be able to instantaneously generate engine torque $M_M$ and to deliver the torque at the friction clutch K so that such torque, minus the drive torque for the auxiliary consumers NA and the drive side power take-offs PTO, is sufficient for attaining acceptable startup acceleration. For this purpose, the engine torque $M_M$ transferred by the friction clutch K must be sufficiently high that the engine torque, minus the drive torques for the output drive side power take-off PTO, exceeds the drive resistance torque resulting from the present drive resistance, that is, the reduced drive resistance torque $M_{FW}$ given the overall transmission ratio and the efficiency of the drive train at the input shaft of the stepped transmission G, exceeds to such a degree that the excess torque is sufficient at least for a minimal startup acceleration.

Figure 1:
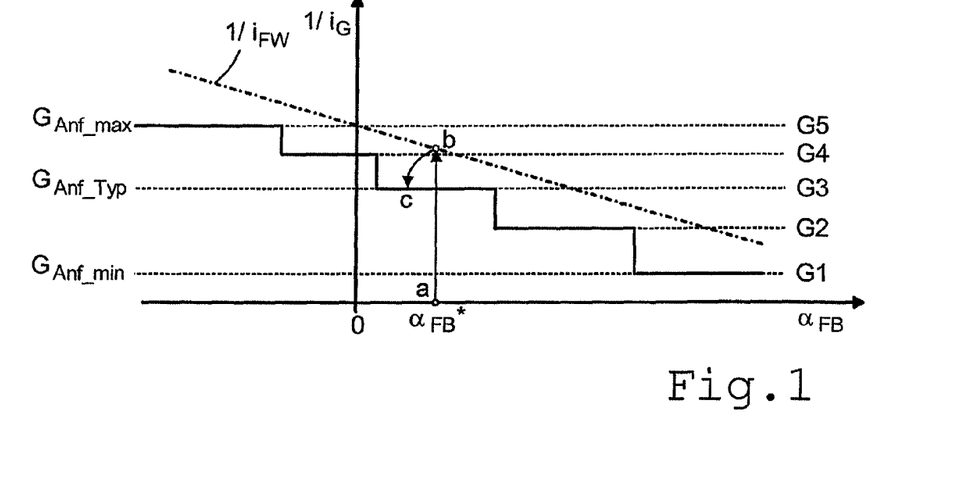

The graph in FIG. 1 shows in general the reciprocal of the transmission ratio $i_G$ over the roadway incline $\alpha_{FB}$, which illustrates the simplified determination of a startup gear $G_{Anf\_Typ}$, which for startup from standstill is determined depending only on the present startup conditions, for instance the vehicle mass $m_{Fzg}$, the roadway incline $\alpha_{FB}$ and the gas pedal position $x_{FP}$, that is, without considering a predetermined breakdown-specific or service life-specific load limit of the friction clutch.

For this purpose, a dash-dotted characteristic line in FIG. 1 shows the reciprocal of the respective transmission ratio $i_{Fw}$ for a specific vehicle mass $m_{Fzg}$ depending on the roadway incline $\alpha_{FB}$, the maximum engine torque $M_{max}$ that can be spontaneously generated which is necessary to compensate for the specific drive resistance in this situation, formed by the sum of the incline resistance and the rolling resistance.

Because a higher drive torque is necessary at the drive wheels for the additional generation of sufficient startup acceleration, the respective startup gear $G_{Anf\_Typ}$ must have a correspondingly higher transmission ratio. For this purpose, FIG. 1 correspondingly shows the reciprocal values of the transmission ratios of the possible startup gears G1-G5 in a stepped characteristic curve. With the presence of a specific roadway incline $\alpha_{FB}^*$ (point a), the dot-dashed characteristic curve provides a transmission ratio $i_{FW}$ (point b) with which the present drive resistance is compensated with the maximum available engine torque $M_{max}$. For attaining an at least minimum vehicle acceleration the amount of which can be influenced by the driver using the gas pedal position $x_{FP}$, the third gear G3 for example is presently determined as a startup gear $G_{Anf\_Typ}$ (point c), which has a correspondingly higher transmission ratio.

In the present method for determining a startup gear, there are, however additional, specifically load-specific startup gears determined according to different criteria. Thus, a further load-specific startup gear $G_{Anf\_MaxN}$ can be determined as the highest startup gear with which an expected number of consecutive startups is possible without substantial cooling phases in the case of startup under the present startup conditions ($m_{Fzg}$, $\alpha_{FB}$, $x_{FP}$) without exceeding a breakdown-specific load limit of the friction clutch in the process.

Likewise, a load-specific startup gear $G_{Anf\_Def}$ can be determined as the highest startup gear with which the service life-specific load limit of the friction clutch is not exceeded with a startup under the present startup conditions ($m_{Fzg}$, $\alpha_{FB}$, $x_{FP}$).

With the design of the drive engine as a turbo-charged internal combustion engine, a turbo-specific startup gear $G_{Anf\_MS}$ is also preferably determined as the highest startup gear with which the intake torque $M_S$ of the drive engine is sufficient as the startup torque in the case of a startup under the present startup conditions ($m_{Fzg}$, $\alpha_{FB}$, $x_{FP}$), whereby a very low, startup speed $n_{Anf}$ lying near the idle speed $n_{idle}$ is possible.

The startup gear $G_{Anf}$ provided for the present startup is determined in a minimum selection from the number of specific startup gears $G_{Anf\_Typ}$, $G_{Anf\_MaxN}$, $G_{Anf\_Def}$, $G_{Anf\_MS}$, that is, the lowest of the startup gears is selected.

Figure 3:
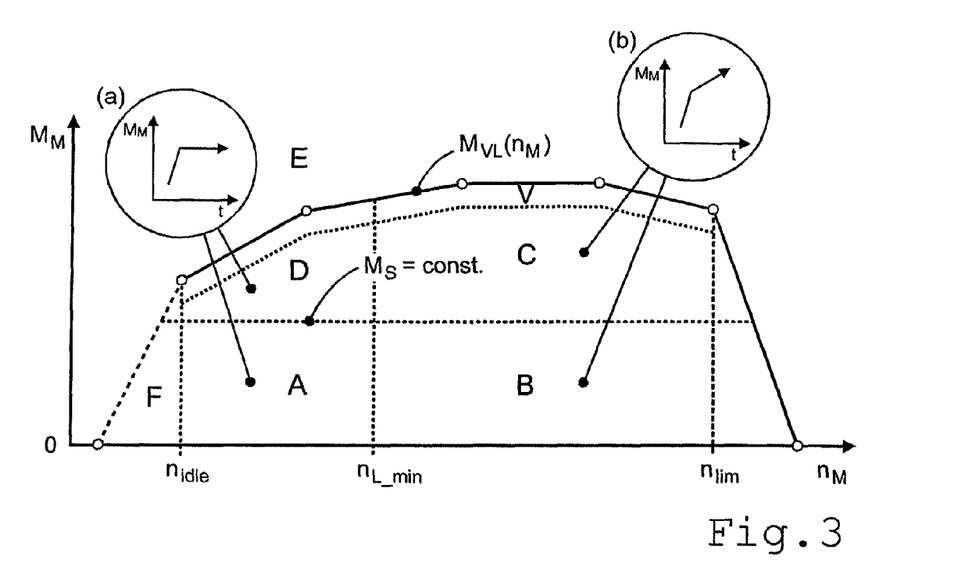

The intake torque $M_S$ required for the determination of the turbo-specific startup gear $M_{Anf\_MS}$ can be read directly from the engine control device or can be taken from an engine dynamic characteristic map, known from the document DE 10 2009 054 802 A1, that can be stored in a data store of the transmission control device, and is shown for example in FIG. 3.

The engine dynamic characteristic map represented in FIG. 3 in a torque/speed diagram contains the immediately available maximum torque $M_{max}$ of the internal combustion engine and the maximum torque gradient $(dM_M/dt)_{max}$, with which the immediately available maximum torque $M_{max}$ can be attained as quickly as possible, in each case as a function of the present engine torque $M_M$ and the present engine speed $n_M$, thus ($M_{max}$=f($M_M$, $n_M$), $(dM_M/dt)_{max}$=f($M_M$, $n_M$)).

The engine dynamic characteristic map is bounded by the stationary full load torque characteristic curve $M_{VL}(n_M)$, the zero torque curve ($M_M$=0), the idle speed $n_{idle}$ and the cut-off speed $n_{lim}$ of the internal combustion engine. The engine dynamic characteristic map is subdivided into four operating regions A, B, C, D by the intake torque characteristic curve $M_S(n_M)$ of the intake torque, simplified here as assumed to be constant $M_S$=const., and the boost threshold speed $n_{L\_min}$ of the internal combustion engine.

In the first region A ($0 \leq M_M < M_S$, $n_{idle} \leq n_M < n_{L\_min}$) that is below the intake torque characteristic curve $M_S$=const. and below the boost threshold speed $n_{L\_min}$, the immediately available maximum torque $M_{max}(n_M)$ of the internal combustion engine is formed in each case by the corresponding value of the intake torque $M_S$, thus ($M_{max}(n_M)$=$M_S$). However, as the intake torque $M_S$ in this region is constant ($M_S$=const.), the immediately available maximum torque $M_{max}$ of the internal combustion engine is represented by a single value ($M_{max}$=$M_S$=const.). Independent of this, the very high maximum torque gradient $(dM_M/dt)_{max}$ in operating region A can also be represented by a single value.

In the second region B ($0 \leq M_M < M_S$, $n_{L\_min} \leq n_M \leq n_{lim}$) lying below the intake torque characteristic curve $M_S$=const. and above the boost threshold speed $n_{L\_min}$, the immediately available maximum torque $M_{max}(n_M)$ of the internal combustion engine is similarly given in each case by the corresponding value of the intake torque $M_S$. Because the intake torque $M_S$ in this region has a constant progression ($M_S$=const.), the immediately available maximum torque $M_{max}$ of the internal combustion engine also in the region B is represented by a single value ($M_{max}$=$M_S$=const.). As with region A, also in region B, the maximum torque gradient $(dM_M/dt)_{max}$ that is also very high beneath the intake torque characteristic curve $M_S$=const. can also be expressed by a single value.

In the third region C ($M_S \leq M_M < M_{VL}(n_M)$, $n_{L\_min} \leq n_M < n_{lim}$), adjacent to region B, and lying above the intake torque characteristic curve $M_S$=const. and above the boost threshold speed $n_{L\_min}$, a further increase of the engine torque $M_M$ is possible up to the respective value of the stationary full load torque characteristic curve $M_{VL}(n_M)$, however, with a significantly lower maximum torque gradient $(dM_M/dt)_{max}$ than in the regions A and B, i.e., below the intake torque characteristic curve $M_S$=const.

In the fourth region D ($M_S \leq M_M < M_{VL}(n_M)$, $n_{idle} \leq n_M < n_{L\_min}$), adjoining at the first region A, above the intake torque characteristic curve $M_S$=const. and below the boost threshold speed $n_{L\_min}$, a further rapid increase of the engine torque $M_M$ is not possible without an increase of the engine speed $n_M$ above the boost threshold speed $n_{L\_min}$. Consequently, in operating region D, the immediately available maximum torque $M_{max}(n_M)$ of the internal combustion engine equals the corresponding value of the intake torque $M_S$, thus ($M_{max}(n_M)$=$M_S$=const.) and the maximum torque gradient $(dM_M/dt)_{max}$ equals zero, thus ($(dM_M/dt)_{max}$=0).

An operating region E which cannot be reached in normal driving operation and thus is not relevant, can be defined above the full load torque characteristic curve $M_{VL}(n_M)$. Below the full load torque characteristic curve $M_{VL}(n_M)$ and the idle speed $n_{idle}$, there is an undesirable but technically attainable operating region F, into which the internal combustion engine can be pushed dynamically from an engine speed $n_M$ lying near the idle speed $n_{idle}$, for example due to a rapid engagement of the friction clutch, and in which there is a danger of stalling the internal combustion engine. In addition, a nearby region lying immediately below the full load torque characteristic curve $M_{VL}(n_M)$ can be defined as an additional operating region V, in which the internal combustion engine under full load, that is along the full load torque characteristic curve $M_{VL}(n_M)$, can be pushed to a lower engine speed $n_M$ or controlled to higher engine speed $n_M$.

Figure 4A:
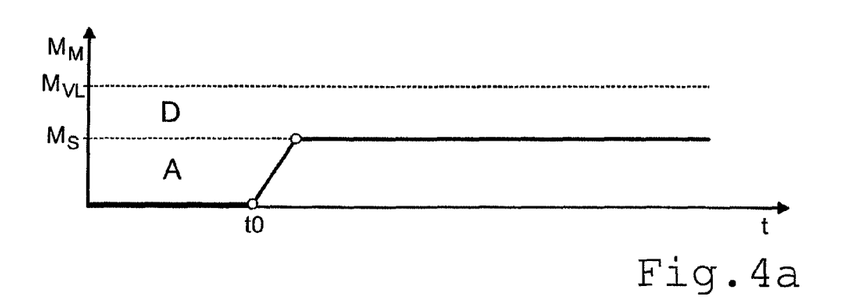

For a startup procedure considered here, with which the drive engine is to be controlled from the idle speed $n_{idle}$ to a startup speed $n_{Anf}$ and from the idle torque $M_{idle} \approx 0$ to the determined startup torque $M_{Anf}$, it must accordingly be noted that the drive engine can be spontaneously loaded, that is, with high torque gradients $dM_M/dt$, only up to the intake torque $M_S$, if the engine speed $n_M$ remains below the boost threshold speed $n_{L\_min}$. This relationship is represented greatly simplified in the torque progression $M_M(t)$ in the image insert (a) of FIG. 3 and in the time progression of FIG. 4a.

Figure 4B:
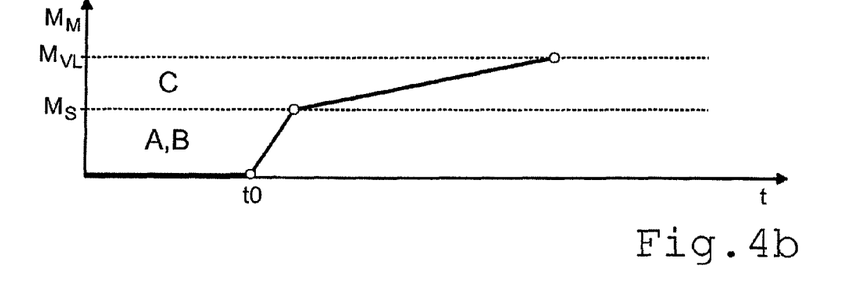

Likewise it is to be noted for the present determination of the startup gear that the drive engine must be accelerated above the boost threshold speed $n_{L\_min}$ for the immediate setting of an engine torque $M_M$ lying above the intake torque $M_S$, that is, it must be controlled from the operating region A into the operating region B, because a further rapid increase of the engine torque $M_M$ is possible only above the boost threshold speed $n_{L\_min}$, even with lower torque gradients $dM_M/dt$. This relationship is illustrated in a greatly simplified manner in the torque progression $M_M(t)$ in the image insert (b) of FIG. 3 and in the time progression of FIG. 4b.

REFERENCE CHARACTERS a point in FIG. 1
b point in FIG. 1
c point in FIG. 1
A operating region
B operating region
C operating region
D operating region
E operating region
F operating region
G stepped transmission, transmission
$G_{Anf}$ startup gear
$G_{Anf+1}$ next higher startup gear
$G_{Anf-1}$ next lower startup gear
$G_{anf\_Def}$ load-specific startup gear
$G_{anf\_Lim}$ load-specific startup gear
$G_{Anf\_max}$ highest possible startup gear
$G_{Anf\_MaxN}$ load-specific startup gear
$G_{Anf\_Max1}$ load-specific limit startup gear
$G_{Anf\_min}$ lowest possible startup gear
$G_{anf\_MS}$ turbo-specific startup gear
$G_{Anf\_Rang}$ maneuvering-specific startup gear
$G_{Anf\_Typ}$ load independent startup gear
$G_{Anf\_vZiel}$ speed specific startup gear
GA axle transmission, axle differential
G1-G5 possible startup gears
$i_{FW}$ transmission ratio for compensating the drive resistance
$i_G$ transmission ratio
K friction clutch, startup element
$M_{Anf}$ startup torque
$M_{FW}$ drive resistance torque
$m_{Fzg}$ vehicle mass
$M_{idle}$ idle speed torque
$M_M$ engine torque
$M_{max}$ maximum torque
$M_S$ intake torque
$M_{VL}$ full load torque
$n_{Anf}$ startup speed
$n_{idle}$ idle speed of rotation
$n_{L\_min}$ boost threshold speed
$n_{lim}$ cut-off speed
$n_M$ engine speed
NA auxiliary consumer
PTO power take-off
$Q_K$ thermal content in the friction clutch
$Q_{K\_max}$ thermal content limit of the friction clutch
t time
t0 time
$T_K$ clutch temperature
$T_{K\_max}$ temperature limit value of the friction clutch
V operating region
VM internal combustion engine, startup engine
$x_{FP}$ gas pedal deflection, gas pedal position
$\alpha_{FB}$ roadway incline
$\alpha_{FB}^*$ present roadway incline
$\Delta Q_{K\_max}$ incremental limit value of the thermal content (of K)
$\Delta T_{K\_max}$ incremental limit value of the clutch temperature
$\Delta T_K$ temperature increase

The invention claimed is:

1. A method for determining a startup gear in a motor vehicle comprising a drive train which comprises a drive engine built as an internal combustion engine, a startup element built as an automated friction clutch, and a transmission built as an automatic stepped transmission, and the startup gear ($G_{Anf}$) being determined for a startup from standstill while maintaining a load limit of the friction clutch, the method comprising the steps of:

determining a load-independent startup gear ($G_{Anf\_Typ}$), with which startup would occur during the startup under present startup conditions ($m_{Fzg}$, $\alpha_{FB}$, $x_{FP}$), without taking into consideration a present load state of the friction clutch and without complying with the load limit of the friction clutch;

determining at least one load-specific startup gear ($G_{Anf\_Max1}$, $G_{Anf\_MaxN}$, $G_{Anf\_Lim}$, $G_{Anf\_Def}$) as a highest startup gear, with which during the startup under the present startup conditions ($m_{Fzg}$, $\alpha_{FB}$, $x_{FP}$), the load limit of the friction clutch would be maintained while taking into consideration the present load state of the friction clutch; and determining the startup gear ($G_{Anf}$) intended for the present startup conditions in a minimum selection as a lowest startup gear of the load-independent startup gear and the at least one load-specific startup gear ($G_{Anf}$=min ($G_{Anf\_Typ}$, $G_{Anf\_Max1}$, $G_{Anf\_MaxN}$, $G_{Anf\_Lim}$, $G_{Anf\_Def}$)).

2. The method according to claim 1, further comprising the step of defining the drive engine as a turbo-charged internal combustion engine, a turbo-specific startup gear ($G_{Anf\_MS}$) is determined as the highest startup gear, with which intake torque ($M_S$) of the drive engine is sufficient as a startup torque for startup under the present startup conditions ($m_{Fzg}$, $\alpha_{FB}$, $x_{FP}$), and the turbo-specific startup gear ($G_{Anf\_MS}$) is considered in the minimum selection of the startup gears.

3. The method according to claim 1, further comprising the step of determining the load-specific limit startup gear ($G_{Anf\_Max1}$) as the highest startup gear with which a single startup is possible during the startup under the present startup conditions ($m_{Fzg}$, $\alpha_{FB}$, $x_{FP}$) without exceeding a breakdown-specific load limit of the friction clutch.

4. The method according to claim 1, further comprising the step of determining the load-specific startup gear ($G_{Anf\_MaxN}$) as the highest startup gear with which in the startup under the present startup conditions ($m_{Fzg}$, $\alpha_{FB}$, $x_{FP}$), an expected number of consecutive startups is possible without any substantial cooling phases, without exceeding a breakdown-specific load limit of the friction clutch.

5. The method according to claim 4, further comprising the step of determining the expected number of consecutive startups, without any substantial cooling phases, by at least one of a use profile of the motor vehicle and a present driving situation of the motor vehicle.

6. The method according to claim 3, further comprising the step of defining the breakdown-specific load limit of the friction clutch as a temperature limit value ($T_{K\_max}$) which must be maintained for avoiding a spontaneous breakdown of the friction clutch, and determining the present load state of the friction clutch before startup using a present clutch temperature ($T_K$) of the friction clutch.

7. The method according to claim 3, further comprising the step of defining the breakdown-specific load limit of the friction clutch as a thermal content limit value ($Q_{K\_max}$) of the friction clutch which must be maintained for avoiding a spontaneous breakdown of the friction clutch, and determining the present load state of the friction clutch, before startup, using a present thermal content ($Q_K$) of the friction clutch.

8. The method according to claim 1, further comprising the step of determining a driving performance oriented load-specific startup gear ($_{Ganf\_Lim}$) as the highest startup gear with which startup under the present startup conditions ($m_{Fzg}$, $\alpha_{FB}$, $x_{FP}$) fulfills a driving performance request of a driver and exceeding a service life-specific load limit of the friction clutch by a specific tolerance threshold.

9. The method according to claim 1, further comprising the step of designating a driving performance oriented startup gear ($G_{Anf\_Lim}$) as a highest gear to which the startup gear determined, in the minimum selection, is manually correctable by a driver.

10. The method according to claim 1, further comprising the step of determining an additional load-specific startup gear ($G_{Anf\_Def}$) as the highest startup gear with which a service life-specific load limit of the friction clutch is not exceeded with the startup under the present startup conditions ($m_{Fzg}$, $\alpha_{FB}$, $x_{FP}$).

11. The method according to claim 8, further comprising the step of defining the service life-specific load limit of the friction clutch as an incremental limit value of clutch temperature ($\Delta T_{K\_max}$) of the friction clutch, by which a present clutch temperature ($T_K$) is to be increased, during an intended startup procedure, for attaining a specified service life goal of the friction clutch.

12. The method according to claim 8, further comprising the step of defining the service life-specific load limit of the friction clutch as an incremental limit value of the thermal content ($\Delta Q_{K\_max}$) of the friction clutch, by which a present thermal content ($Q_K$) of the friction clutch is to be increased during the intended startup procedure for attaining a specified service life goal of the friction clutch.

13. The method according to claim 1, further comprising the step of determining, if necessary, a speed-specific startup gear ($G_{Anf\_vZiel}$) as the highest startup gear with which during the startup under the present startup conditions ($m_{Fzg}$, $\alpha_{FB}$, $x_{FP}$), a predetermined target speed is attainable without a downshift with an engaged friction clutch, and a speed-specific startup gear ($G_{Anf\_vZiel}$) is considered with the minimum selection of the startup gears.

14. The method according to claim 1, further comprising the step of using a next lower startup gear ($G_{Anf}=_{Ganf-1}$) for the intended startup when the startup gear ($G_{Anf}$), determined from the minimum selection, is unavailable.

15. The method according to claim 14, further comprising the step of using a next higher startup gear ($G_{Anf}=_{Ganf+1}$) for the intended startup if the startup gear ($G_{Anf}$), determined in the minimum selection, and the next lower startup gear ($G_{Anf-1}$) are unavailable.

16. The method according to claim 14, further comprising the step of continually searching for a next lower gear, if neither the startup gear ($G_{Anf}$) determined in the minimum selection nor the next lower startup gear ($G_{Anf-1}$) is available for the intended startup, until reaching a first gear of the stepped transmission, and using a next higher startup gear ($G_{Anf}=_{Ganf+1}$) as the startup gear for the intended startup until reaching the first gear of the stepped transmission when neither the startup gear ($G_{Anf}$) determined in the minimum selection nor the next lower startup gear are available.

17. The method according to claim 15, further comprising the step of preventing startup and signaling the startup prevention to a driver, if the next higher startup gear ($G_{Anf+1}$) lies above the load-specific limit startup gear ($G_{Anf\_max1}$), by issuing at least one of an audible and a visual warning signal.

18. The method according to claim 15, further comprising the step of permitting startup with the startup gear ($G_{Anf+1}$) lying above the load-specific limit startup gear ($G_{Anf\_Max1}$) in an emergency operation, if a specific driver action requires an emergency startup.

19. The method according to claim 1, further comprising the step of determining, with a known maneuvering situation, an additional maneuvering-specific startup gear ($G_{Anf\_Rang}$) as the highest startup gear with which under the present startup conditions ($m_{Fzg}$, $\alpha_{FB}$, $x_{FP}$), friction power generated at the friction clutch in the continuous slipping operation corresponds to available cooling performance of the friction clutch, and considering the maneuvering specific startup gear ($G_{Anf\_Rang}$) with the minimum selection of the startup gears.

* * * * *